(12) United States Patent
Giurgiu et al.

(10) Patent No.: US 10,223,380 B2
(45) Date of Patent: Mar. 5, 2019

(54) MAP UPDATES FROM A CONNECTED VEHICLE FLEET

(71) Applicant: HERE Global B.V., Veldhoven (NL)

(72) Inventors: Gavril Giurgiu, Deerfield, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 164 days.

(21) Appl. No.: 15/078,441

(22) Filed: Mar. 23, 2016

(65) Prior Publication Data

US 2017/0277716 A1 Sep. 28, 2017

(51) Int. Cl.
*G06F 17/30* (2006.01)
*G01C 21/32* (2006.01)
*H04L 29/08* (2006.01)

(52) U.S. Cl.
CPC ....... *G06F 17/30241* (2013.01); *G01C 21/32* (2013.01); *G06F 17/30345* (2013.01); *G06F 17/30371* (2013.01); *H04L 67/12* (2013.01)

(58) Field of Classification Search
CPC ......... G06F 17/30241; G06F 17/30371; G06F 17/30345; G01C 21/32; H04L 67/12
See application file for complete search history.

(56) References Cited

U.S. PATENT DOCUMENTS

| | | | |
|---|---|---|---|
| 6,351,709 B2 | 2/2002 | King et al. | |
| 6,853,913 B2 | 2/2005 | Cherveny et al. | |
| 6,964,040 B2 * | 11/2005 | Osborn | G06F 17/30324 369/47.18 |
| 8,284,995 B2 | 10/2012 | Diaz et al. | |
| 8,620,532 B2 | 12/2013 | Curtis et al. | |
| 8,849,567 B2 | 9/2014 | Gupta et al. | |
| 9,080,887 B2 | 7/2015 | Geelen et al. | |
| 9,830,706 B2 * | 11/2017 | Barajas Hernandez | G01C 21/26 |
| 2003/0120619 A1 * | 6/2003 | Osborn | G06F 17/30324 706/19 |
| 2010/0207751 A1 | 8/2010 | Follmer et al. | |

(Continued)

FOREIGN PATENT DOCUMENTS

| | | |
|---|---|---|
| EP | 0921509 A2 | 6/1999 |
| WO | WO2009037578 | 3/2009 |
| WO | WO2013132031 A1 | 9/2013 |

OTHER PUBLICATIONS

Alonso R et al: "Quasi-Copies: Efficient Data Sharing for Information Retrieval Systems", Advances in Database technology. International conference on extending Database technology, Mar. 14, 1988, pp. 443-468.

(Continued)

*Primary Examiner* — Jerrah Edwards
(74) *Attorney, Agent, or Firm* — Lempia Summerfield Katz LLC

(57) ABSTRACT

A road furniture item or another type of road object is detected by at least one sensor. An associated geographic position associated with the road furniture item or road object is determined. After a predetermined time is reached, the geographic position is compared to a local database. A remote database is updated after the predetermined time is reached and according to the comparison with the local database. In some examples, the data indicative of the road furniture item or the road object is deleted based on a confidence level in the local database.

20 Claims, 8 Drawing Sheets

(56) References Cited

U.S. PATENT DOCUMENTS

| | | | |
|---|---|---|---|
| 2015/0012510 A1* | 1/2015 | van der Laan | G08G 1/0112 |
| | | | 707/702 |
| 2015/0088814 A1 | 3/2015 | van der Laan et al. | |
| 2015/0254986 A1 | 9/2015 | Fairfield et al. | |
| 2017/0023945 A1* | 1/2017 | Cavalcanti | G08G 1/0116 |
| 2017/0084037 A1* | 3/2017 | Barajas Hernandez | |
| | | | G06T 7/0044 |

OTHER PUBLICATIONS

European Search Report for related European Application No. 17162128.7 dated Aug. 9, 2017.
Kazmeyer et al., How Does the TomTom Mao Share Work, accessed Mar. 22, 2016, http://smallbusiness.chron.com/tomtom-map-share-work-26803.html.

* cited by examiner

MAP UPDATES FROM A CONNECTED VEHICLE FLEET

FIELD

The following disclosure relates to map updates, and more particularly, map updates from a fleet of connected vehicles.

BACKGROUND

Map databases may be used to provide navigation based features such as routing instructions for an optimum route from an original location to a destination location and map based features such as section and display of maps to manually locate locations or points of interest. Map databases are used in driver assistance systems or driverless systems. Map databases are also used in systems that improve vehicle fuel economy, such as systems that optimize transmission gear selection taking into account upcoming slope and speed changes.

Map attributes often change over time. As new roads are built, other roads are closed, speed limits change, or locations of business are changed, the geographic database should be updated. Real world observations may be indicative of the map attribute changes. Crowd sourcing may be used to receive update information from users. However, the data transfer may place an unwanted burden on the user devices as well as the network. Reductions in the amount of data transferred between the user devices and the map developer, reduces costs and improves the speed and overall operation of the system.

SUMMARY

In an embodiment, a method for updating a remote geographic database at specified times includes receiving sensor data indicative of a road furniture item, determining a geographic position associated with the road furniture item, delaying based on a first comparison of a current time to a predetermined time, performing a second comparison of the geographic position and the data indicative of the road furniture item to a local database, and sending an update to the remote geographic database in response to the first comparison and the second comparison.

In an embodiment, an apparatus for sending updates to a remote database at predetermined times includes a sensor, a position detector, and a controller. The sensor is configured to receive sensor data indicative of a road object. The position detector is configured to determine a geographic position associated with the road object. The controller is configured to determine when a predetermined time has elapsed since the sensor data was received, compare the geographic position of the road object to a local database, and generate an update message for the remote database in response to the predetermined time elapsing.

In an embodiment, a method for geographic database updates includes receiving sensor data indicative of a road furniture item, determining a geographic position associated with the road furniture item, identifying a confidence value in a local database, comparing the confidence value to a confidence threshold, and discarding the sensor data indicative of the road furniture item in response to the confidence value exceeding the confidence threshold.

In an embodiment, an apparatus includes a sensor, a position detector, a vehicle database, and a controller. The sensor is configured to receive sensor data indicative of a road object. The position detector is configured to determine a geographic position associated with the road object. The vehicle database includes a confidence level associated with the road object. The controller is configured to compare the geographic position of the road object to the vehicle database and discard the data inactive of the road object in response to the confidence level.

BRIEF DESCRIPTION OF THE DRAWINGS

Exemplary embodiments of the present invention are described herein with reference to the following drawings.

DETAILED DESCRIPTION

Figure 1:
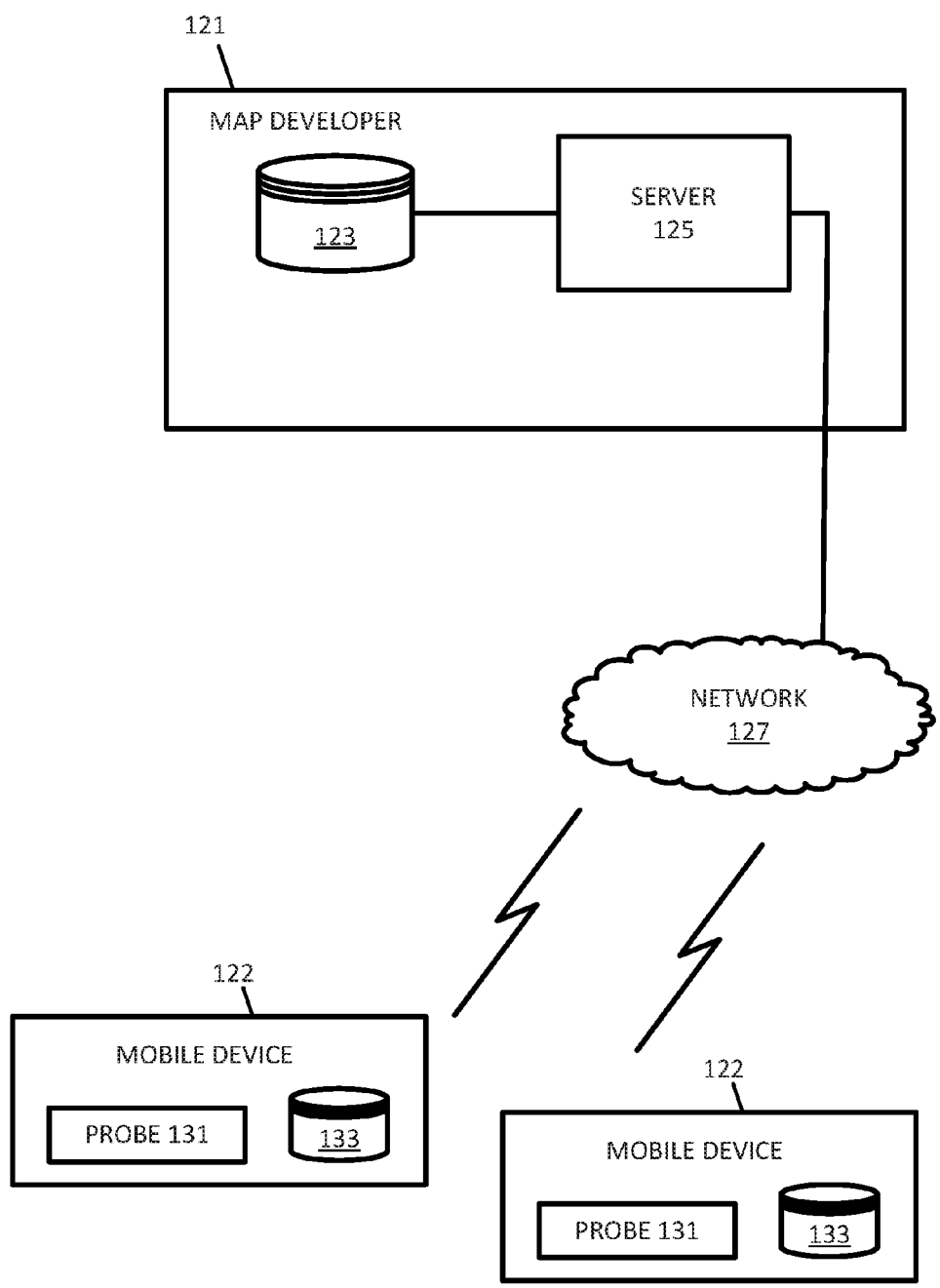
FIG. 1 illustrates an example system for map updates.

A connected vehicle includes a communication device and an environment sensor array. The connected vehicle may include an integrated communication device coupled with an in-dash navigation system. The connected vehicle may include an ad-hoc communication device such as a mobile device or smartphone in communication with a vehicle system. The communication device connects the vehicle to a network including at least one other vehicle and at least one server. The network may be the Internet or connected to the Internet.

The sensor array may include one or more sensors configured to detect surroundings of the vehicle, and more specifically, one or more road furniture items. The sensor array may include multiple sensors. Example sensors include an optical distance system such as light detection and ranging (LiDAR), an image capture system such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

A road furniture item may include any object related to the movement of traffic along a roadway. Example road furniture items include traffic signs (e.g., speed limit signs), traffic lights, crosswalks, transit stops, or other physical items that include information on the flow of traffic along the roadway. In one example, road objects such as these road furniture items are permanent or semi-permanent and do not typically change over time. Other road objects may include transient or semi-transient objects. Examples include hazards such as potholes, stalled vehicles, or foreign objects (e.g., blown out tires, roadkill, or fallen rock).

The server includes a server map. The server map includes road segments representative of roadways or other pathways, which are linked together at nodes. The server map includes locations names and points of interest at particular geographic locations or location along a road segment. The server map includes road furniture items tied to geographic locations or locations along a road segment. The map at the map server may include a high definition map with the speed limits of road segments, curvature, slope, the direction of travel, length and number of lanes.

The connected vehicle, which may be either integrated in the vehicle or a mobile device of a traveler of the connected vehicle, includes a vehicle map, which is in a format (e.g., schema and values) similar to the server map. The server pushes updates from the server map to the vehicle map. Alternatively, the vehicle may request updates from the server. In either situation, the updates may be made on a predetermined schedule or at a predetermined interval. The predetermined time schedule may dictate that updates occur at certain times during the day (e.g., on the hour, the half hour, or every X minutes past the hour). The predetermined interval may cyclically repeat (e.g., every X minutes).

Road furniture items or road objects may be changed or moved from time to time. As the connected vehicle drive near the road furniture items, the sensor array observes or detects the road furniture items in real time. Updates may be transferred from the vehicle to the server. In turn, at the predetermined time, the server provides the updates to the fleet of vehicles. A fleet of vehicles may include vehicles dispatched for the purpose of collecting data but may also include connected vehicles of any type that may be connected in a fleet only in that the vehicles are from the same manufacturer, share the same map provider for navigation, or have been assigned to collector sensor data. In the alternative, the fleet of vehicles may be vehicles with mobile devices associated with a navigation application, mapping application, or data collection application to collect sensor data.

In one example, the server provides updates to the fleet of vehicles based on geographic positions (i.e., portions of the vehicle map are updated at a time). The following embodiments includes techniques for reducing the bandwidth required to update the server map and/or maintain the vehicle map in agreement with the server map. The bandwidth for updates is reduced through minimizing or eliminating cumulative updates that provide redundant or likely redundant updates. For example, detected road objects may be sent from the connected vehicles to the server only after waiting a delay period. The delay period ensures that the vehicle map has been updated in the time passed since the road object was detected. Thus, the vehicle map is a most up to date state before the vehicle reports detected discrepancies with the vehicle map. In addition, before sending the data indicative of the road object or detected discrepancies, the vehicle may check a confidence level associated with the road object in the local map. At low confidence levels, the vehicle passes the data indicative of the road object or detected discrepancies to the server for increasing the confidence level. At high confidence levels, the information may not be passed to the server at all. That is, the existence of a road object already in the vehicle map and/or server map at a high confidence level may be of no use in updating the maps. Bandwidth and other computing resources are conserved by blocking transfer to the server in this situation.

In one example, the road furniture item or road object is a speed limit sign. The sensor array includes a camera that captures an image of the speed limit sign including a speed limit value. Based on the location where the image was captured, or a location from an analysis of the image, a local geographic database is queried for a previously stored speed limit value for the location. Even if the previously stored speed limit value is different than the detected speed limit value, the system waits for a subsequent update for the geographic database from a server, or an expected time for such as update from the server. If the update changes the previously stored value, the system discards the detected speed limit value or reports an improved confidence level for the detected speed value to the server. If the update does not change the previously stored value, the detected speed limit value is reported to the server as a new value for the speed limit sign.

FIG. 1 illustrates an example system for map updates. In FIG. 1, one or more mobile device 122 include probes 131 and are connected to the server 125 though the network 127. A database 123, including the server map, is also connected to the server 125. The database 123 and the server 125 make up a developer system 121. Multiple mobile devices 122 are connected to the server 125 through the network 127. The mobile devices 122 may serve as probes 131 or be coupled with probes 131. The mobile devices 122 include databases 133 corresponding to the vehicle maps. Additional, different, or fewer components may be included.

Data is collected an individual mobile device 122 to update the server map at the server 125. The mobile devices 122 do not update vehicle maps directly. Instead, the mobile devices 122 selectively send updates, based on data collected by probes 131, to the server 125. The server 125 sends out periodic updates to the mobile devices 122.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

Figure 2:
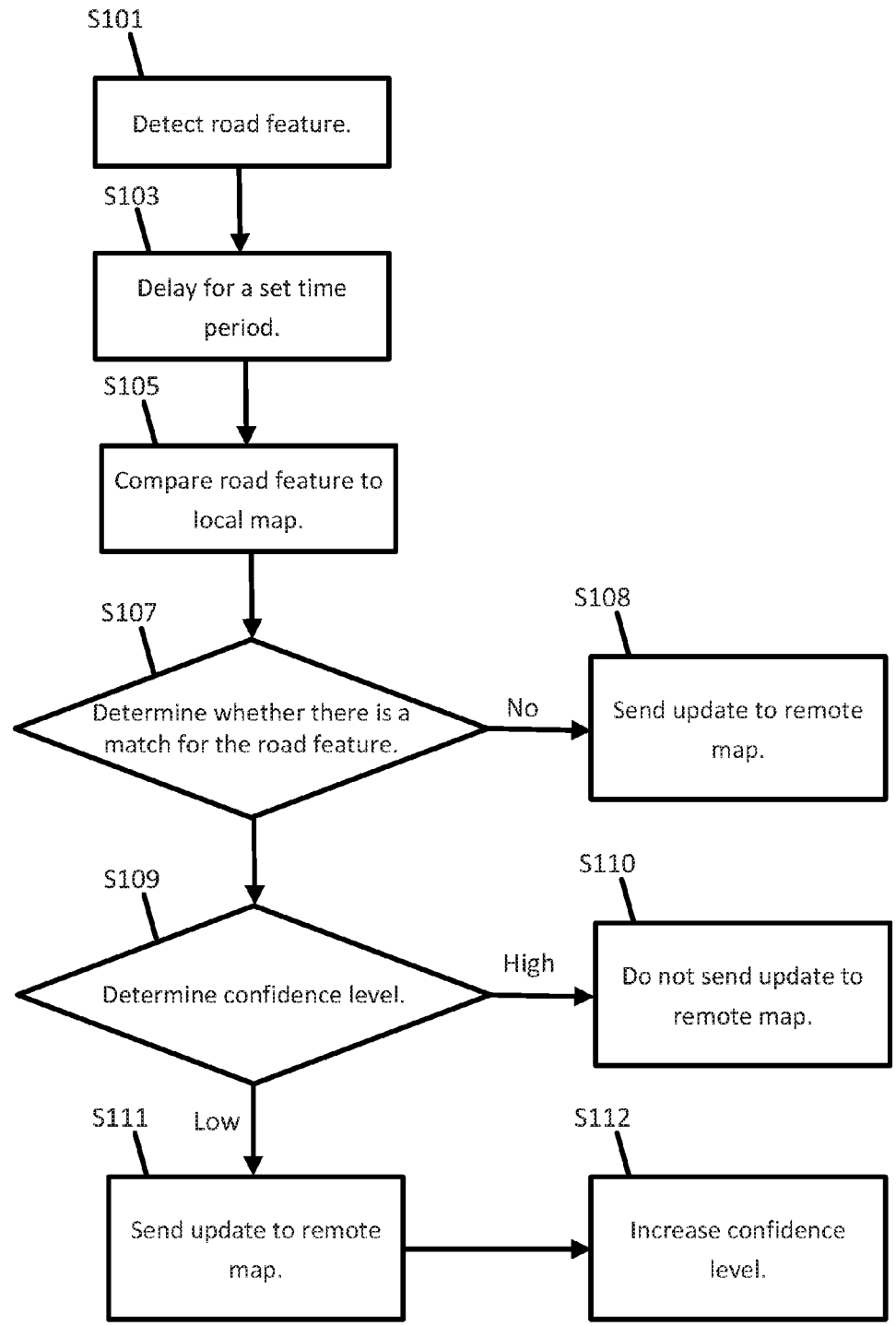
FIG. 2 illustrates an example flowchart for map updates.

FIG. 2 illustrates an example flowchart for map updates using the system of FIG. 1. Additional, different or fewer components may be included.

At act S101, the mobile device 122 receives or probe 131 detects a road feature. The road feature may be road objects or aspects of road objects. The road object may be a road furniture item or another object such as a hazard or another vehicle. The probe 131 generates sensor data indicative of the road feature or road object. The probe data may include distance data as generated from the optical distance system (e.g., LiDAR), the image capture system (e.g., camera), the sound distance system (e.g., SONAR), or the radio distance system (e.g., RADAR). The probe data may also include the geographic position of the vehicle 124, and the geographic position of the road feature may be calculated from the geographic position of the vehicle and the associated camera data, LiDAR data, SONAR data, or RADAR data. The geographic position of the road feature may be at an offset from the geographic position of the vehicle 124.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122. The position circuitry may be included in the mobile device 122 or in another module of the vehicle.

The mobile device 122 may compare the probe data to a template. For example, a two dimensional or a three dimensional template for the road feature may be compared to the probe data. The template may include several points that form the shape of the road feature. When a predetermined portion of the points of the template match the detected road feature, the mobile device 122 may determine that a road feature has been detected.

The mobile device 122 may perform an image processing technique on the probe data. Example image processing techniques include an edge detection, feature extraction or transforms (e.g., scale invariant feature transform), or vector classification. In edge detection, the brightness, or another image characteristic, of adjacent image pixels in the probe data. In feature extraction or transforms, the image is analyzed to identify particular features that indicate the layout. Similarly, vector classification may compare vectors representative of boundary elements to vectors from the image.

In some examples, multiple types of probe data may be combined in order to detect and identify the road feature. For example, the three dimensional template may be used to identify the shape of the road feature with a comparison of distance or range data. Once the shape has been identified as a sign, the particular type of sign or the insignia of the sign may be identified through one of the image processing techniques.

Figure 3:
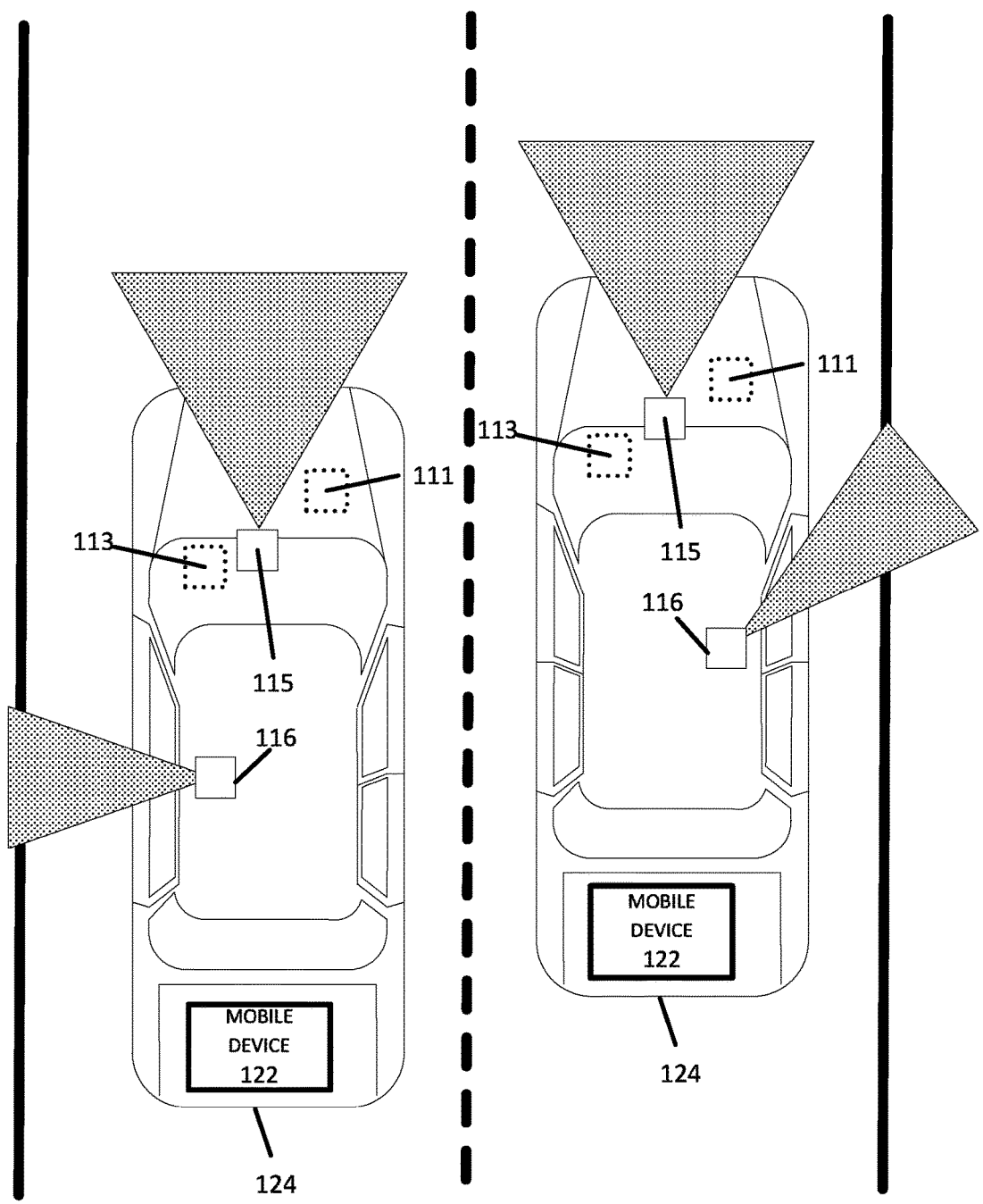
FIG. 3 illustrates an example of fleet vehicles.

FIG. 3 illustrates two example vehicles 124 in a fleet of vehicles and various arrangements of example sensors for the probes. A first sensor 115 may be mounted on the vehicle 124 to provide a forward looking view. The first sensor 115 may collect data at a wide angle to survey the full view of the upcoming roadway. A second sensor 116 may be mounted on the vehicle to provide an alternate view from the vehicle 124. In one example, the second sensor 116 may be to the lateral side of the vehicle, which may be a closer range for collecting data of traffic signs. The alternate view and the forward looking view may be at an angle (e.g., 45 degrees or 90 degrees) to one another.

Data from the first sensor 115 may be combined with data from the second sensor 116 in order to provide a more complete representation of the collected road feature. In one example, one of the sensors is a distancing system (e.g., LIDAR, SONAR, RADAR) and the other of the sensors is an imaging system (e.g., camera). The data from the distance system is matched with a shape of a three dimensional template to determine a type of road feature (e.g., traffic sign). The data from the imaging system is matched with the words or shapes in a two dimensional templates for the type of road feature.

In some alternatives, additional sensors may be included in the vehicle 124. An engine sensor 111 may include a throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor. In addition to directly matching templates, data collected from the engine sensor 111 or the vehicle sensor 113 may be used to identify the road feature. For example, when the vehicle 124 brakes, the templates may be reduced to braking related templates such as stop signs, traffic lights, or crosswalks. In another example, when the vehicle 124 turns, the templates may be reduced to turning related templates such as road obstacles, exits lanes, or curve signs. Other examples are possible.

At act S103, the mobile device 122 delays for a set time period. The mobile device 122 may start a timer and compare (first comparison) the elapsed time of the timer to the set time period. The set time period may be selected based on the update schedule between the server map and vehicle map. The set time period may be determined and distributed by the map developer 121. That is, mobile devices 122 associated with the same developer or manufacturer may receive delay time period message from the server 125. The delay time period message may define a predetermined schedule such as specific times of day that the updates occur. The delay time period may be equal or greater than the maximum amount of time required between updates. The delay time period message may include a predetermined interval. The predetermined time schedule may dictate that updates occur at certain times during the day (e.g., on the hour, the half hour, or every X minutes past the hour). For example, when updates occur every X Minutes past the hour and X is ten minutes, updates occur at 8:00 AM, 8:10 AM, 8:20 AM, 8:30 AM, 8:40 AM, 8:50 AM, 9:00 AM, and so on throughout the day. In another example, when X is 14, updates occur at 8:00 AM, 8:14 AM, 8:28 AM, 8:42 AM, 8:56 AM, 9:00 AM, and so on throughout the day.

At act S105, the mobile device 122 compares (second comparison) the road feature detected in act S101 to a local vehicle map after the delay in act S103 has occurred. After the mobile device 122 has delayed or waited for the set time period, an update, or any scheduled update or necessary update, must have occurred from the server map to the vehicle map. The position of the vehicle, or position of the road feature relative to the vehicle, has been logged when the road feature was detected in act S101. The mobile device 122 queries the vehicle map using the position of the vehicle or detected road feature.

The vehicle map and the server map may list road objects with positions and object attributes. In the example of traffic signs, the object attributes may include a sign type (e.g., speed limit, no passing, no left turn, or other examples), and a sign value (e.g., 50 mph, 100 kph, another value, or empty). Some sign types have no value, which corresponds to a sign value of empty. Example sign types with no value include no passing, stop, and yield signs.

The object attributes may also include a confidence value. The confidence value indicates a number of mobile devices (e.g., vehicles, mobile phones, or other mobile devices) that have detected the road object at or near the same geographic position. The confidence interval may be incremented for each detection. In other words, the initial detection corresponds to a confidence value of 1, the second detection corresponds to a confidence value of 2, and so on. Other incremental techniques may be used such as incrementing the confidence value for every N detection, where N is an integer value. The confidence value may be proportionally related to the number of time the road objected has been detected or the number of unique vehicles that have detected the road object.

The object attributes may also include a location uncertainty value. The location uncertainty value is a measure of the statistical distribution of the measurements for a particular road object. The location uncertainty value describes the geographic range for the detections or vehicles that have contributed to the confidence value. The location uncertainty value may be the standard deviation of the positions for the detected road objects divided by the square root of the number of observations.

As a basic example, when one vehicle initially detects a road object, the confidence value is low and the location uncertainty value is high. As more vehicles detect the same road object, the confidence value increases and the location uncertainty value decreases. The position uncertainty value decreases relatively more as the cluster of detections includes points nearer to one another and decreases relatively less as the cluster of detections includes points farther from one another.

Figure 4:
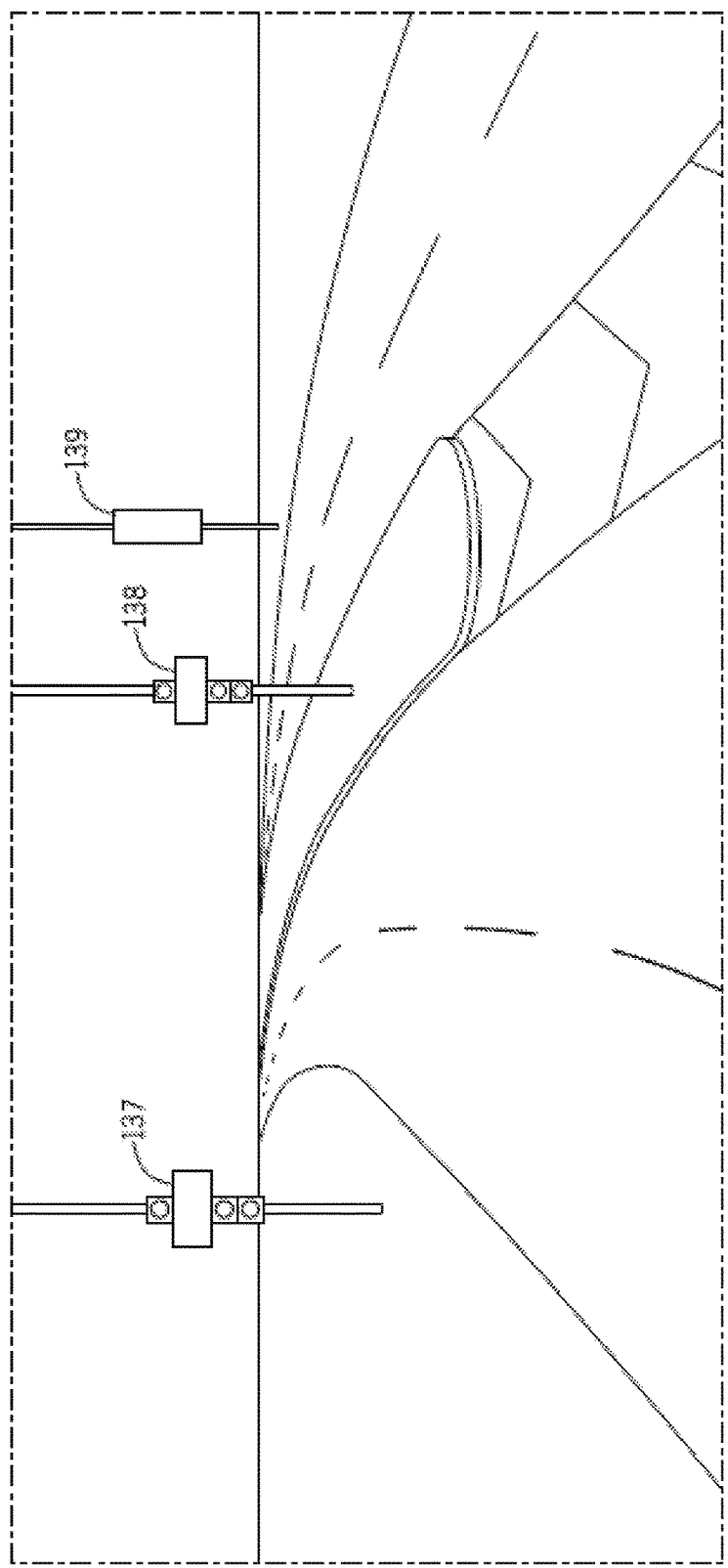
FIG. 4 illustrates example road furniture units.

FIG. 4 illustrates example road furniture units or road features placed along the roadway. FIG. 4 illustrates a left-hand side traffic object 137, a median traffic object 138, and a right-hand side traffic object 139. While only traffic lights and traffic signs are shown, other road objects are possible. The traffic objects may be flow related traffic objects, intersection related traffic objects, hazard related traffic objects, informative path related traffic objects, informative point of interest (POI), and transit related traffic objects.

Flow related traffic objects include information indicative of the flow of traffic along the roadway. For example, traffic signs include indicia proportional to the maximum speed of the roadway, curve speed warnings may include indicia proportional to the maximum speed of the roadway, and traffic light statistics may indicate the traffic flow in a particular area.

Informative path related traffic objects may include marker signs that indicate the functional classification of the roadway or a particular type of roadway. Example functional classification include arterial roads, collector roads, and local roads. Intersection related traffic objects may include objects that indicate the existence of an intersection. Examples include street signs, stop signs and traffic lights. In additional, traversing utility cables, which are substantially perpendicular to the direction of travel may be indicative of an intersection.

Hazard related traffic objects may include stalled vehicles, emergency vehicles, and road obstacles. The road obstacles may include any foreign object in the roadway. Informative point of interest (POI) related objects may include signs that describe a particular location or POI. Transit related traffic objects may be related to other forms of transportation. Example transit related objects include pedestrian crosswalks, pedestrian signs, bus stops, transit stops, trolley stops, or subway stops.

At act S107, the mobile device 122 determines whether there is a geographical match for the road feature based on the comparison made in act S105. The match may be a threshold geographic distance. In other words, the mobile device 122 access the stored geographic position (e.g., average of past detections) for the road object. When the recently detected geographic position is within the threshold geographic distance, the detection is considered a match. When there is no match, the detected road object is considered a new object. In response to the determination of a new object, an update message (e.g., proposed update) is sent from the mobile device 122 to the server 125 to potentially update the remote map, as shown by act S108. The update may be based on the data from the probe 131.

The threshold geographic distance may be a function of the position uncertainty level. The location uncertainty value describes the variance between past detections of the road object. Past detection refers to a previous detection of the road object may by one of the fleet of mobile devices 122 or vehicles 124. The location uncertainty value may be the standard deviation of the geographic positions from the past detections divided by the square root of the number of past detections. For example, when the location uncertainty value is higher, positions of the past detections are more spread apart geographically, and the threshold geographic distance is set to a larger distance. When the location uncertainty value is lower, positions of the past detections are less spread apart geographically, and the threshold geographic distance is set to a smaller distance.

The threshold geographic distance may be set to a minimum distance, even when the location uncertainty value is very high (e.g., even when the location uncertainty value is very high or approaches infinity, the threshold geographic distance may be set to the minimum distance). In one example, the location uncertainty is based on a maximum number of geographic position measurements. When a quantity of the past detections of the road has reached the maximum number and an additional detection is received, the mobile device may remove, from the location uncertainty calculation, the past detection that is farthest from the mean geographic location.

At act S109, in response to determining there is a geographical match for the road feature in act S107, the mobile device 122 determines the confidence level for the road object. The mobile device 122 queries database 133 and the local map for the confidence level.

The confidence level may be a numerical value that is classified in two or more ranges. In one example, the confidence level is either a high level or a low level. In another example, the confidence level is either a high level, medium level, or a low level. The numerical value for the confidence level may be proportional to the number of past detections. In one example, a default for the numerical value is zero (indicative of no past detections), the low level for the numerical value is one to five (indicative of one to five past detections), the medium level for the numerical value is six to ten (indicative of six to 10 past detections) and the high level for the numerical values is higher than 10 (indicative of more than 10 past detections).

In act S110, when the confidence level for the road object is at a first level (e.g., high numerical value), the mobile device 122 does not send an update to the server 125 and the server map. The mobile device 122 may discard, delete or ignore the detection made in act S101, which is in response to the comparison of the geographic location and the comparison of the confidence level. The mobile device 122 may flag the detection made in act S101 to block transmission to the server 125. The mobile device 122 may identify that the detection made in act S101 is redundant.

The mobile device 122 determines, based on the confidence level, that any map update already confirmed with high confidence is redundant. Because data transmission from the mobile device 122 through the network 127 to the server 125, bandwidth requirements of the system are reduced and the efficiency of the system is increased. In some examples, the majority of road features have already been confirmed with high confidence. Considering a road sign passed by a vehicle once a minute, and even with probe saturation (e.g., percentage of vehicles or mobile device that provide probe data of the total number of vehicles or mobile devices) of only 1%, the number of detections required for high confidence would be reached in only a few hours. Therefore, compared to a system in which all detections are reported to the server 125, this system achieves a very significant bandwidth reduction.

In act S111, when the confidence level for the road object is at a second level (e.g., low or medium numerical value), the mobile device 122 sends an update to the server 125 and the server map. The update from the mobile device 122 is based on the detection at S101. The update from the mobile device 122 may include an instruction to increment the confidence value based on the detection. In act S112, the confidence level is increased, either for the vehicle map by the mobile device 122, for the server map by the server 125, or both.

The incremental change of the confidence value may be variable. In one example, the confidence level may be incremented as a function of the location uncertainty value. When the detected road object has a low location uncertainty value, and the detection made in act S101 qualifies within the threshold distance set according to the location uncertainty value, the incremental step for increasing the confidence value may be a large value. Conversely, when the detected road object has a high location uncertainty value, the incremental step for increasing the confidence value may be a small value.

In another example, the confidence level may be incremented as a function of the type of sensor data from act S101. In one example, when a single source of sensor data detects the road feature, a low incremental amount for the confidence value is selected, and when more than one source of sensor data selects the road feature, a high incremental amount for the confidence value is selected. In another example, different data collection devices are assigned different increment values for the confidence value. Distancing systems with a low density of sensor data points may be assigned a low incremental amount for the confidence value, and distancing systems with a high density of sensor data pints may be assigned a high incremental amount for the confidence value. When the road object is detected using LiDAR data, a high incremental value may be used for the confidence level. When the road object is detected using camera data, a medium incremental value may be used for the confidence level. When the road object is detected using SONAR data, or RADAR data, a low incremental value may be used for the confidence level.

Figure 5:
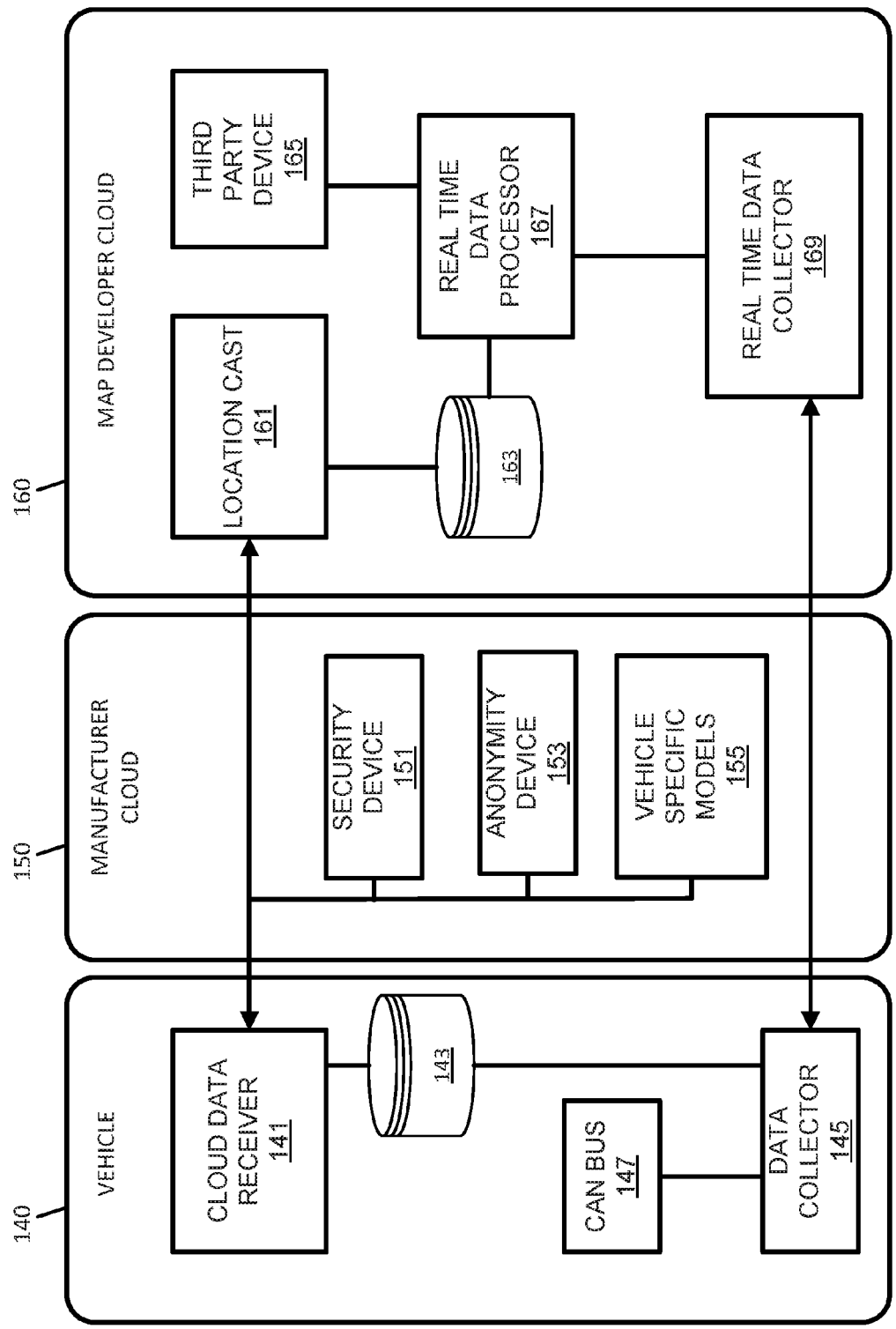
FIG. 5 illustrates an example system for map updates.

FIG. 5 illustrates an example system for map updates. The example system includes a vehicle system 140, a manufacturer cloud system 150, and a map developer cloud system 160. Multiple manufacturer cloud systems 150, each administered by a different vehicle manufacturer, may be in communication with the map developer cloud system 160. The vehicles system 140 and may include a cloud data receiver 141, an onboard database 143, a data collector 145, and a vehicle bus or controller area network (CAN) bus 147. The manufacturer cloud system 150 includes a security device 151, an anonymity device 153, and vehicle specific models 155. The map developer cloud system 160 includes a location cast 161, a server database 163 including the server map, a third party device 165 for third party content, a real time data processor 167, and a real time data collector 169. The third party device 165 may provide additional supplemental content that is provided to connected vehicles through the location cast 161. The additional content may include traffic information, weather information, event information, or POI information. Additional, different, or fewer components may be included.

The CAN bus 147 is coupled with one or more sensing systems of the vehicle. The sensing systems may include one or more of the sensors described above including cameras, LiDAR, SONAR, RADAR, position sensors, engine sensors and vehicle sensors. The CAN bus 147 may utilize a communication protocol such as a publish and subscribe system for exchanging messages between the one or more sensing systems and the data collector 145.

The data collector 145 may include a controller for preliminary processing of the data collected by the one or more sensing systems. The data may be filtered or averaged over time. The data collector 145 may also compare the processed sensor data with road features in the onboard database 143. Before the comparison, the data collector controller may initiate a delay equal to or greater to an update interval of the onboard database 143. When the delay passes, data collector 145 determines whether or not to send the processed sensor data to the real time data collector 169.

When the sensed road feature is not included in the onboard database 143, the data collector 145 generates a message including the sensed road feature and sends the message to the read time data collector. When the sensed road feature is included in the onboard database 143 and associated with a confidence level below a threshold, the data collector 145 generates a message including the sensed road feature and sends the message to the read time data collector. When the sensed road feature is included in the onboard database 143 and associated with a confidence level equal to or above the threshold, the data collector 145 does not generate or send a message including the sensed road feature. In some examples, the data collector 145 may active delete or discard the data for the sensed road feature.

In the map developer cloud system 160, the real time data processor 167 connects the server database 163 including the server map, the real time data collector 169, and the third party device 165. The real time data collector 169 receives the update messages from the data collector 145 and forwards the information to the real time data processor 167. The real time data processor 167 writes new road features to the server database 163 and increments confidence levels to the server database 163 for existing road features.

Whether or not updates are received are dependent on the update interval set by the location cast 161. The delay applied by the data collector 145 depends on the update interval used by the location cast 161. The update interval specifies how often updates from the server database 163 are sent to the cloud data receiver 141 and the onboard database 143. The update interval may be set by an administrative or user input to the map developer cloud system 160. In other examples, the update interval may be set automatically according to network/bandwidth restraints or according to the number of connected vehicles. The location cast 161 may identify updates to send according to a version number stored in the server database 163.

The location cast 161 may push new map updates to the vehicles at X minute intervals from the hour if there is an update. (e.g., if X=10 minutes, then changes are only pushed at 10 minute intervals from the hour). When the real time data processor 167 receives a road feature observation from the vehicle, the real time data processor 167 determines whether the road feature is a new feature (not included in the server database 163) or an existing feature (included in the server database 163). When the road feature is new, the real time data processor 167 adds the road feature to the server map in the server database 163 and assigns a low confidence value. When the road feature is existing, the real time data processor 167 increases the confidence level associated with the road feature.

In some examples, the update message from the data collector 145 may indicate that a road feature in the onboard database 143 was not detected, which may be referred to as a missing or absent road feature. When the real time data processor 167 receives an update message of a missing road feature, the real time data processor 167 determines whether the road feature is also not in the server database 163. If the missing road feature is also absent from the server database 163, no action is taken. When the missing road feature is present in the server database 163, the real time data processor 167 decrements the associated confidence level. When the confidence level falls below a minimum threshold, which may be a result of multiple connected vehicles reporting the missing road feature, the real time data processor 167 deletes the road feature from the server database 163.

In any of these examples, as the subsequent update interval passes the location cast 161 broadcasts at least the updated components of the server database 163 to the cloud data receiver 141, either directly or through the manufacturer cloud system 150. The updated components may include only confidence level changes. In other examples, the cloud data receiver 141 may request updates, at the update interval.

In some examples, the manufacturer cloud system 150 passively passes update information to the vehicle system 140. In other examples, the manufacturer cloud system modifies or limits communication between the vehicle system 140 and the map developer cloud system 160. Security device 151 may provide encryption or certificate authentication for the communication. The anonymity device 153 may hide the identity of the vehicle system 140 so that the map developer cloud system 160 does not have name or demographic information for the user of the vehicle system 160. The manufacturer cloud system 150 may modify the communications between the location cast 161 and the cloud data receive 141 based on the type of vehicle. For example, different vehicles may have different levels of map attributes or feature. The manufacturer cloud system 150 may block some update messages from the location cast 161 for specific vehicles or models of vehicles. The manufacturer cloud system 150 may be omitted and communications may be made directly between the vehicle system 140 and the map developer cloud system 160.

Figure 6:
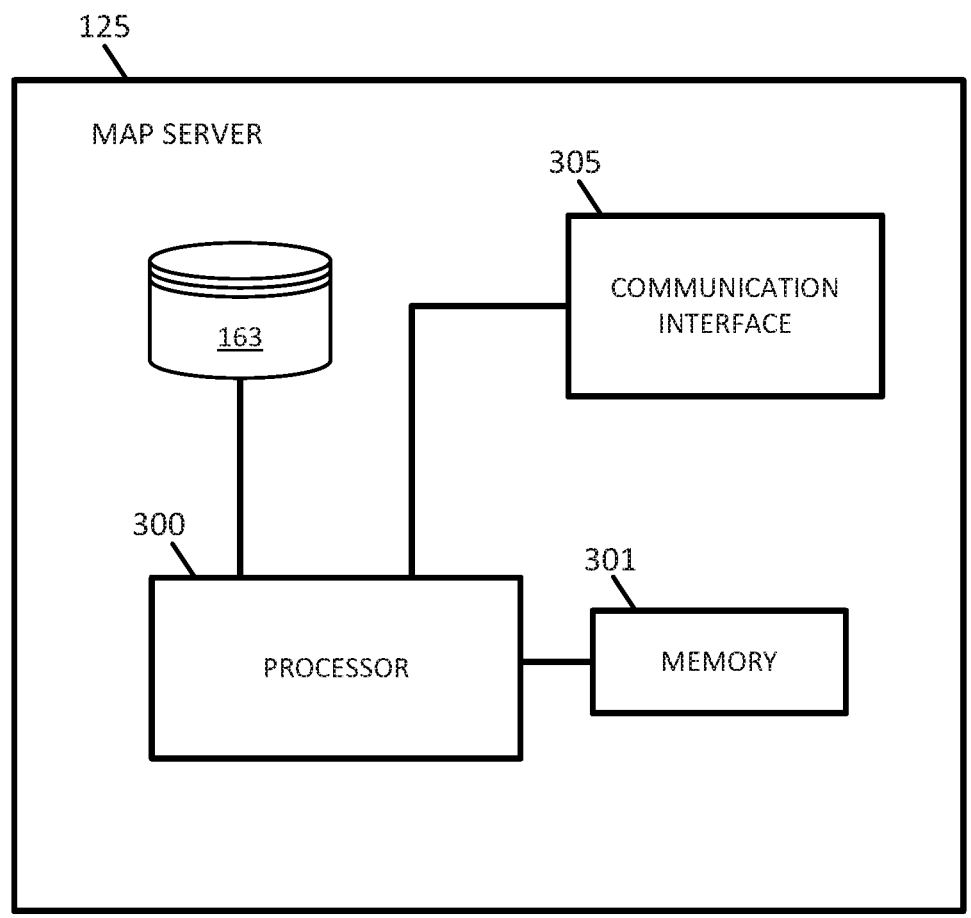
FIG. 6 illustrates an example server.
Figure 7:
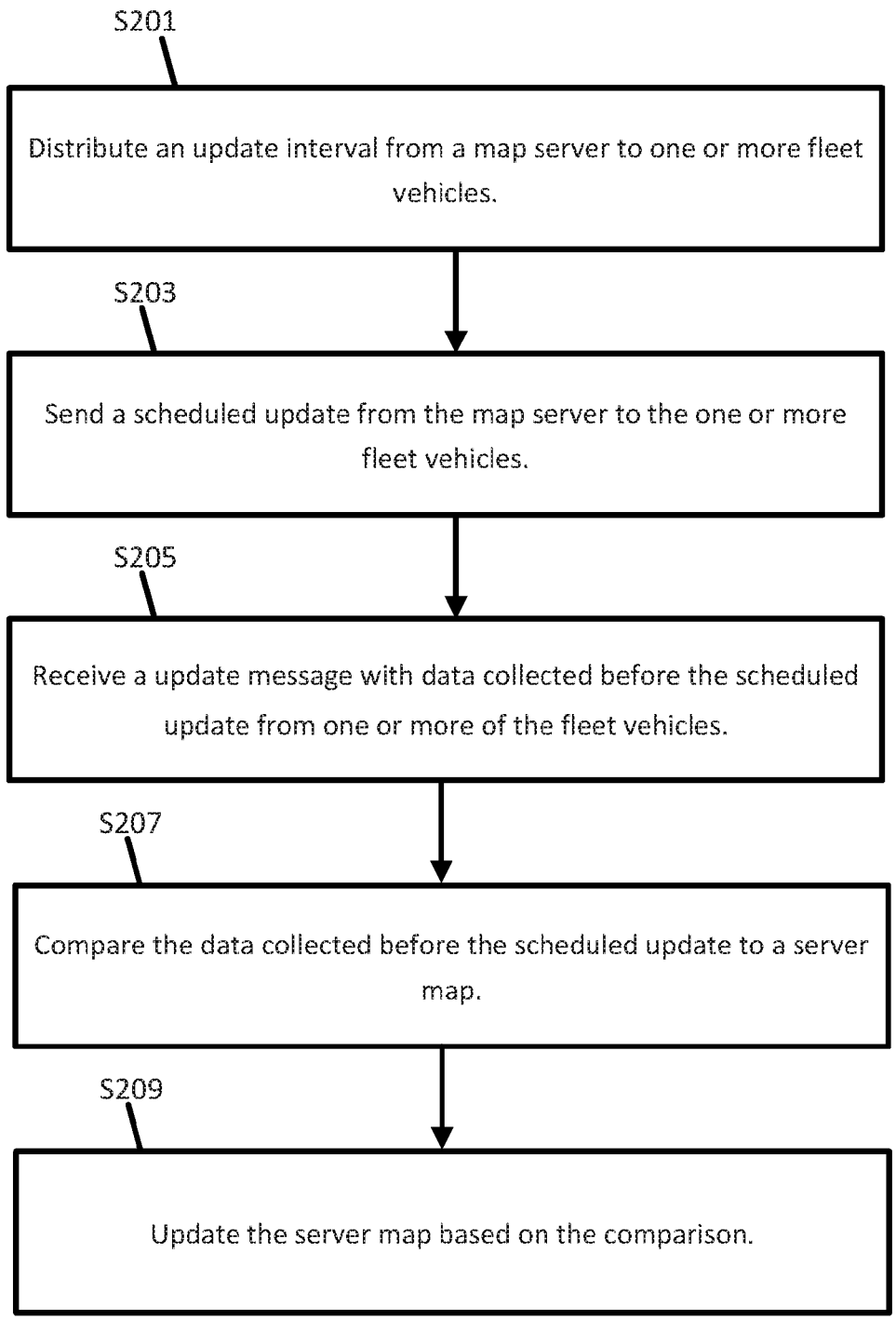
FIG. 7 illustrates an example flowchart for high efficiency map updates using the server of FIG. 6.

FIG. 6 illustrates an example server 125, which may apply to the system of FIG. 1. The server 125 includes a processor 300, a communication interface 305, a memory 301, and a database 143. An input device (e.g., keyboard or personal computer) may be used to enter settings to the server 125. Example settings include the update interval for distributing updates to the fleet of vehicles and the confidence threshold for determining established road features. The database 143 may include the server map or remote map. Additional, different, or fewer components may be provided in the server 125. FIG. 12 illustrates an example flowchart for the operation of server 125. Additional, different, or fewer acts may be provided.

At S201, the processor 300 or the communication interface 305 distributes an update interval to the one or more fleet vehicles. The update interval may be accessed from memory 301. The update interval may be determined according to a service agreement, based on a user input, or based on trial and error. For example, the processor 300 may identify a time interval that balances the version integrity of the map with the computing and network resources required to distribute the map to the fleet vehicles.

At S203, the processor 300 or the communication interface 305 sends a scheduled update for the map to the fleet vehicles according to the update interval. In the meantime, one or more of the fleet vehicles may have collected data for a road object. Rather than immediately report the data for the road object, the one or more fleet vehicles delay for a time period equal or greater within a predetermined proportion to the update interval. Therefore, at S205, when the processor 300 or the communication interface 305 receives an update message from one of the fleet vehicles, the data collected that resulted in the update message may have been collected before the scheduled update in act S203.

At S207, the processor 300 compares the data for the road object in the update message to the server map in the database 143. It is possible that more than one fleet vehicle has reported the road object. At S209, the processor 300 updates the server map in response to the comparison in act S207. When the road object is already included in the server map, the processor 300 increases a confidence level for the road object stored in database 143. When the road object is not already included in the server map, the processor 300 writes the road object to the database 143.

Figure 8:
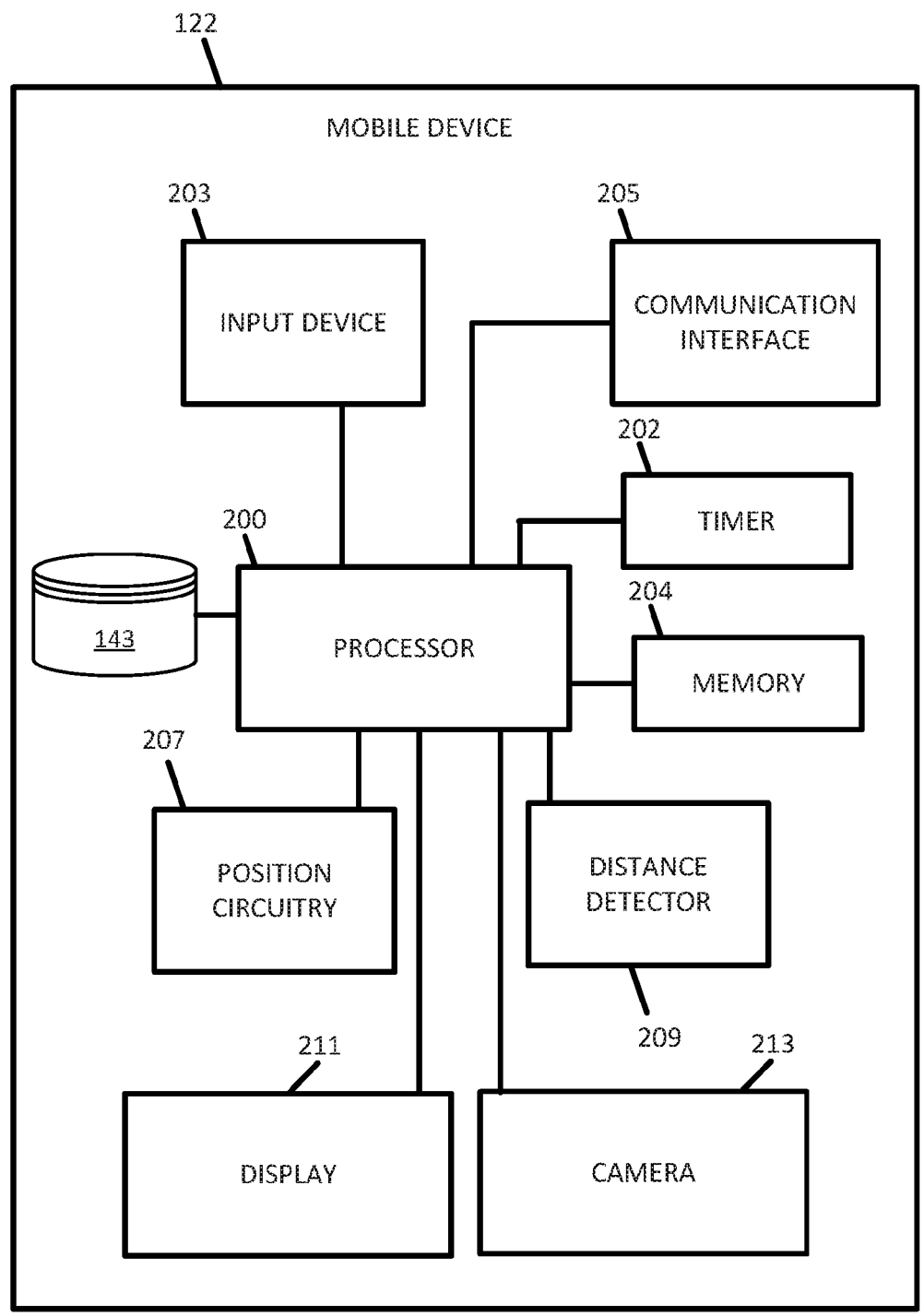
FIG. 8 illustrates an example mobile device.

FIG. 8 illustrates an exemplary mobile device 122 of the system of FIG. 1. The mobile device 122 includes a processor 200, a vehicle database 123, a timer 202, a memory 204, an input device 203, a communication interface 205, position circuitry 207, a distance detector 209, a display 211, and a camera 213. Additional, different, or fewer components are possible for the mobile device 122.

The distance detector 209 is configured to receive sensor data indicative of a road object such as a road sign or a traffic light. The distance detector 209 may emit a signal and detect a return signal. The signal may be a laser signal, a radio signal, or a sound signal. The distance detector 209 may determine a vector (distance and heading) from the position of the mobile device 122 to the position of the road object. The camera 213 is also configured to receive sensor indicative of the road object. Images collected by the camera 213 may be analyzed to determine the distance to the road object. In one example, the number of pixels or relative size of the road object indicates the distance. Smaller objects are farther away. In another example, the relative differences between two or more images indicates the distance. For example, when two successive images are collected at a specific distance apart, the relative changes in the road object indicates the distance to the road object.

The position detector or position circuitry 207 is configured to determine a geographic position associated with the road object. The geographic position may be directly determined from the physical location of the road object or may be determined based on a position of the vehicle when collecting the sensor data for the road object. The geographic position may be map matched to the vehicle map in the database 123. The geographic position may be determined from the absolute position detected by position circuitry 207 summed with the vector for the road object. Map matching is a technique for assigning the data point to a digital map such as the vehicle map.

The timer 202 is configured to determine when a predetermined time has elapsed since the sensor data was received. The timer may be a standalone integrated circuit. The timer may be performed by the processor 200. The timer 202 may compare the time that has elapsed since the sensor data was received to an update schedule.

When the predetermined time has elapsed, the processor 200 compares the geographic position of the road object to database 123 and generates an update message in at least two scenarios. The update message is generated is response to the road object being absent from the local database. The update message is generated is response to the confidence value in the vehicle database 123 for the road object. The communication interface 205 sends the update message to a map server through cellular or another wireless technology.

The mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the vehicle database 123.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the vehicle database 123.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the traffic estimation level of a current or upcoming road link based on the vehicle database 123.

The mobile device 122 may generate a routing instruction based on the vehicle database 123. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The navigation device 122 may then provide the end user with information about the optimum route in the form of guidance that identifies the maneuvers required to be taken by the end user to travel from the origin to the destination location. Some mobile device 122 show detailed maps on displays outlining the route, the types of maneuvers to be taken at various locations along the route, locations of certain types of features, and so on.

The mobile device 122 may plan a route through a road system, or modify a current route through a road system based on the matched probe data. The route may extend from a current position of the mobile device or an origin to a destination through the road segment matched with the probe data. Possible routes may be calculated based on a Dijkstra method, an A-star algorithm or search, and/or other route exploration or calculation algorithms that may be modified to take into consideration assigned cost values of the underlying road segments. Various other aspects, such as distance, non-navigable areas, and/or restrictions, may be considered in addition to the cost to determine an optimum route.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 800 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123, 133, 143, and 163 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for updating a remote geographic database at specified times, the method comprising:
   receiving sensor data indicative of a road object;
   determining a geographic position associated with the road object;
   performing, at a controller, a geographic comparison of the geographic position and the data indicative of the road object to data associated with the geographic position in a local database,
   wherein the geographic comparison is performed in response to a time comparison between a time since the sensor data was received and a predetermined time that is equal to or greater than an update interval that specifies how often updates are provided from the remote geographic database to the local database; and
   sending an update to the remote geographic database in response to the time comparison and the geographic comparison, the update including the data indicative of the road object.

2. The method of claim 1, wherein the update is sent to the remote geographic database in response to the road object being absent from the local database.

3. The method of claim 1, wherein the road object includes a road sign or a traffic light.

4. The method of claim 1, further comprising:
   discarding, by the controller, the sensor data indicative of the road object in response to the time comparison and the geographic comparison.

5. The method of claim 4, wherein the sensor data indicative of the road object is discarded when the geographic comparison indicates the local database already includes the road object.

6. The method of claim 1, further comprising:
   identifying a confidence value in the local database; and
   comparing the confidence value to a confidence threshold.

7. The method of claim 6, wherein the update is sent to the remote geographic database in response to confidence value being less than the confidence threshold.

8. The method of claim 7, further comprising:
   discarding the sensor data indicative of the road object in response to confidence value being greater than the confidence threshold.

9. The method of claim 1, wherein the sensor data indicates an absence of a road object listed in the local database.

10. The method of claim 1, wherein the update interval is set according to a user input, a network restraint, a bandwidth restraint, or a number of connected vehicles.

11. An apparatus for sending updates to a remote database at predetermined times, the apparatus comprising:

a sensor configured to receive sensor data indicative of a road object;

a position detector configured to determine a geographic position associated with the road object;

a timer configured to determine when a predetermined time has elapsed since the sensor data was received, wherein the predetermined time is equal to or greater than an update interval that specifies how often updates are provided from the remote database to a local database; and a controller configured to compare the geographic position associated with the road object to the local database, and generate an update message for the remote database in response to the predetermined time elapsing.

12. The apparatus of claim 11, further comprising:

a communication interface configured to send the update message to a map server.

13. The apparatus of claim 11, wherein the update message is generated is response to the road object being absent from the local database.

14. The apparatus of claim 11, wherein the update message is generated is response to a confidence value in the local database for the road object.

15. A method for geographic database updates, the method comprising:

receiving, from a memory, sensor data indicative of a road object;

determining a geographic position associated with the road object;

identifying a confidence value in a local database;

comparing the confidence value to a confidence threshold; and discarding the sensor data indicative of the road object from the memory in response to the confidence value exceeding the confidence threshold.

16. The method of claim 15, further comprising:

performing a comparison of the geographic position and the data indicative of the road object to the local database; and sending an update message to a remote database in response to the confidence value being less than the confidence threshold.

17. The method of claim 15, further comprising:

starting a timer for the local database; and performing the comparison of the confidence value and the confidence threshold in response to the timer reaching a predetermined time equal to or greater than an update interval that specifies how often updates are provided from a remote database to the local database.

18. The method of claim 15, further comprising:

receiving a scheduled update after the sensor data indicative of the road object is received, wherein the scheduled update includes the confidence level.

19. The method of claim 18, wherein the confidence threshold is based on data collected by a fleet of vehicles.

20. An apparatus for a vehicle traveling on a roadway, the apparatus comprising:

a sensor configured to receive sensor data indicative of a road object of the roadway;

a memory configured to store the sensor data;

a position detector configured to determine a geographic position associated with the road object;

a vehicle database including a confidence level associated with the road object;

a controller configured to compare the geographic position associated with the road object to the vehicle database and discard, from memory, the data indicative of the road object in response to the confidence level; and a timer configured to determine when a predetermined time has elapsed since the sensor data was received, wherein the predetermined time is equal to or greater than an update interval that specifies how often updates are provided from a remote database to the vehicle database, wherein the controller is configured to generate an update message for the remote database in response to the predetermined time elapsing.

* * * * *